United States Patent [19]
Lucas, Jr. et al.

[11] Patent Number: 5,913,533
[45] Date of Patent: Jun. 22, 1999

[54] SEAT ASSEMBLY INCLUDING COLLAPSIBLE STROLLER

[75] Inventors: Earl Clyde Lucas, Jr., Austin, Tex.; John Lucian Calene, Franklin; James Faro Ventimiglia, Macomb, both of Mich.

[73] Assignee: Lear Corporation, Southfield, Mich.

[21] Appl. No.: 08/805,064

[22] Filed: Feb. 24, 1997

[51] Int. Cl.$^6$ .................................................. B62B 1/00
[52] U.S. Cl. .................... 280/649; 280/642; 280/650; 224/275; 297/238
[58] Field of Search .......................... 280/30, 642, 643, 280/650, 648, 649; 224/275; 297/188.04, 188.05, 217.1, 238

[56] References Cited

U.S. PATENT DOCUMENTS

| | | | |
|---|---|---|---|
| 4,189,164 | 2/1980 | Moorer | 280/87.05 |
| 4,386,790 | 6/1983 | Kassai | 280/650 |
| 4,632,409 | 12/1986 | Hall et al. | 280/30 |
| 4,647,054 | 3/1987 | Chong | 280/30 |
| 4,678,196 | 7/1987 | Steenburg | 280/47.41 |
| 4,679,804 | 7/1987 | Johnson | 280/30 |
| 4,685,688 | 8/1987 | Edwards | 280/30 |
| 4,750,783 | 6/1988 | Irby et al. | 297/250 |
| 4,762,331 | 8/1988 | Tucker et al. | 280/30 |
| 4,784,433 | 11/1988 | Purnell-Ayres | 297/184 |
| 4,786,064 | 11/1988 | Baghdasarian | 280/30 |
| 4,822,064 | 4/1989 | Hunter | 280/30 |
| 4,823,405 | 4/1989 | Porter | 2/80 |
| 4,828,281 | 5/1989 | Sanchas | 280/30 |
| 4,847,945 | 7/1989 | Schwartz et al. | 16/30 |
| 4,903,980 | 2/1990 | Schwartz | 280/647 |
| 5,076,599 | 12/1991 | Lockett et al. | 280/204 |
| 5,149,113 | 9/1992 | Alldredge | 280/30 |
| 5,292,174 | 3/1994 | Ohnuma | 297/188 |
| 5,388,852 | 2/1995 | Bigo et al. | 280/642 |
| 5,398,951 | 3/1995 | Ryo | 280/30 |
| 5,454,584 | 10/1995 | Haut et al. | 280/642 |
| 5,524,503 | 6/1996 | Ishikura | 74/501.6 |
| 5,556,162 | 9/1996 | Raffini | 297/256.15 |
| 5,603,550 | 2/1997 | Holdampf et al. | 297/238 |
| 5,639,144 | 6/1997 | Naujokas | 297/238 |
| 5,647,634 | 7/1997 | Presser et al. | 297/238 |

*Primary Examiner*—Lanna Mai
*Assistant Examiner*—Lynda Jasmin
*Attorney, Agent, or Firm*—Brooks & Kushman PC

[57] ABSTRACT

The seat assembly for an interior of a motor vehicle comprises a seat back having a recess including a bottom, and a collapsible stroller having a deployed position and a retracted position adapted to be received in the recess. The stroller includes a pair of opposed frame members defining a plane, a pair of rear wheel support members, a pair of connecting links, and a pair of front wheel support members. Each of the rear wheel support members is connected to a frame member at a first connection point and pivotable thereabout between a first position corresponding to the deployed position of the stroller and a second position corresponding to the retracted position of the stroller. In their second position, the rear wheel support members lie substantially in the plane defined by the frame. A first end of each connecting link is pivotally connected to a frame member at a second connection point, such that each connecting link is movable between a first position corresponding to the deployed position of the stroller and a second position corresponding to the retracted position of the stroller. In their second position, the connecting links also lie substantially in the plane defined by the frame.

21 Claims, 2 Drawing Sheets

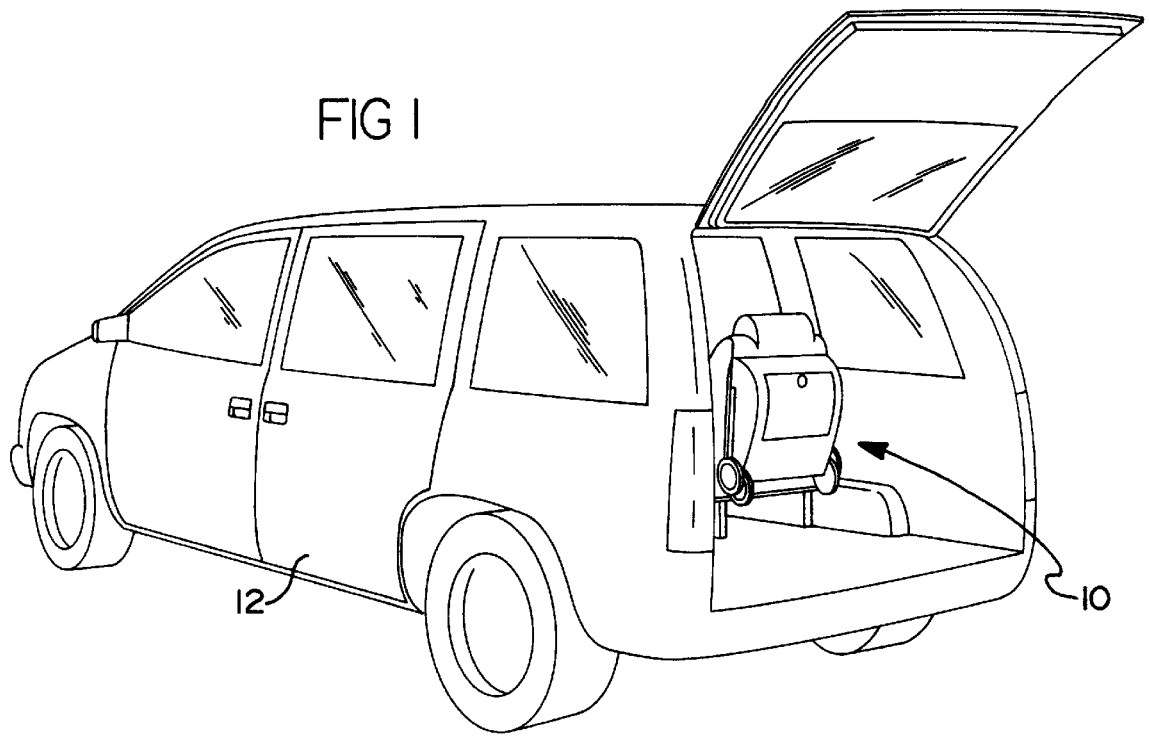
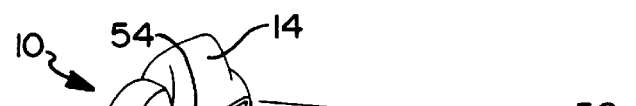

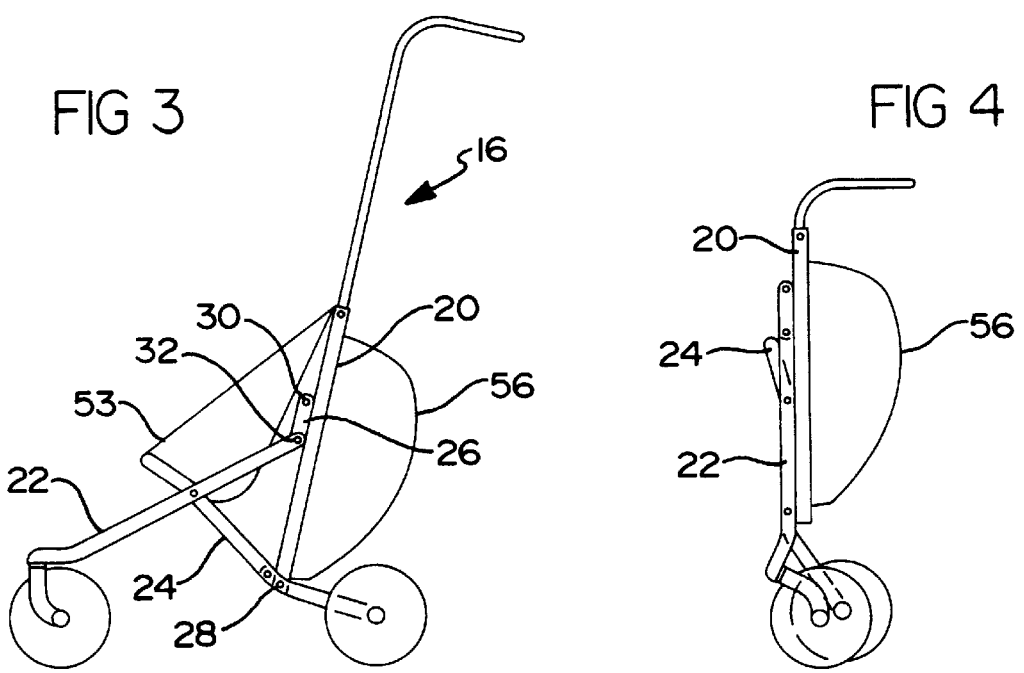
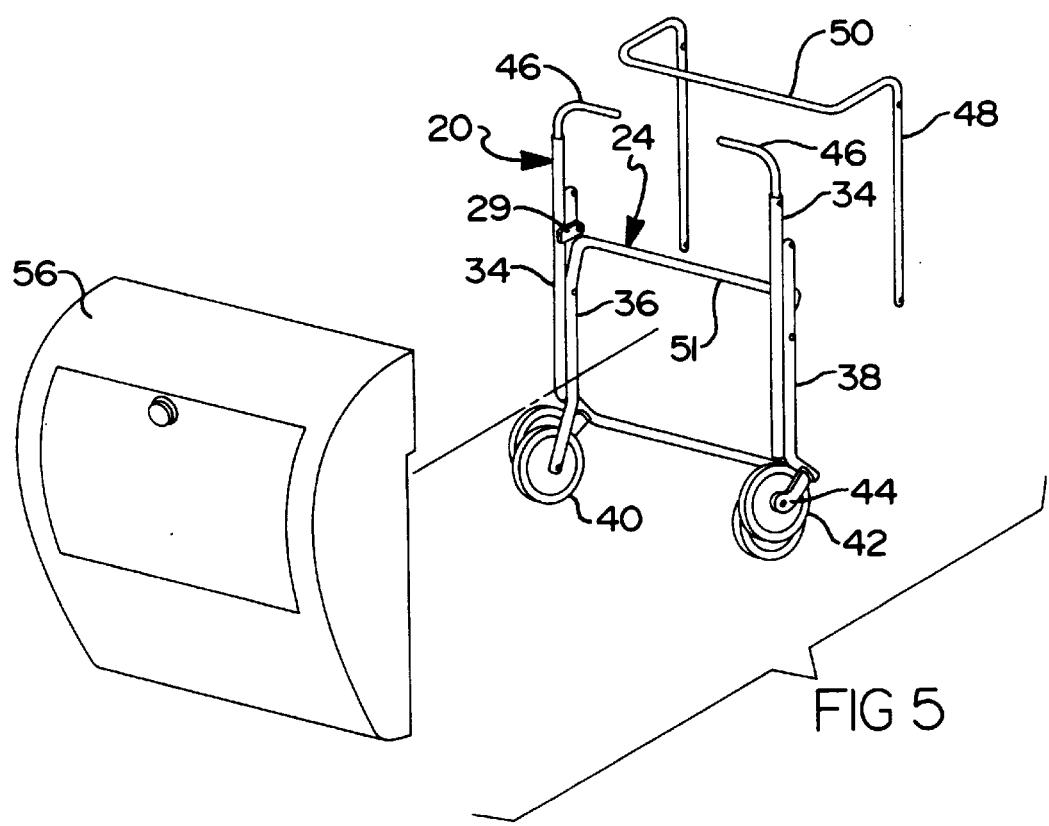

SEAT ASSEMBLY INCLUDING COLLAPSIBLE STROLLER

TECHNICAL FIELD

This invention relates to a motor vehicle seat assembly having a collapsible stroller.

BACKGROUND ART

It is often advantageous, in those motor vehicles in which children are passengers, to transport a stroller in the vehicle for use at the destination. In an attempt to combine functions, various designs have been proposed for strollers that convert into infant restraint seats. Such designs are cumbersome, complex and expensive to manufacture, and most include hard, three-dimensional seats. For instance, U.S. Pat. No. 5,398,951 and U.S. Pat. No. 4,786,064 show convertible child car seat/strollers having molded plastic seats. Because such conventional designs employ hard, three-dimensional seats, they are not easily stored when not in use.

Furthermore, strollers are often equipped with pouches or packs on or near the rear of the stroller and into which the child's attendant can stow miscellaneous articles. A particular problem with this arrangement, however, is that when the pouch is heavily weighted, and the child is not in the stroller, the center of gravity shifts close to or even outside of the axis of the rear wheels. This condition is at least precarious, and may be unstable.

SUMMARY OF THE INVENTION

The present invention is a seat assembly for a motor vehicle. The seat assembly comprises a seat back having a recess, and a collapsible stroller having a deployed position and a retracted position adapted to be received in the recess. The collapsible stroller includes a frame, front and rear wheel supports, and a connecting link. The rear wheel support is connected to the frame at a first connection point, and is pivotable about the first connection point between a first position corresponding to the deployed position of the stroller and a second position corresponding to the retracted position of the stroller. In its second position, the rear wheel support lies substantially in a plane defined by the frame. The connecting link has first and second ends, with the first end of the connecting link being connected to the frame at a second connection point. The front wheel support is pivotally connected to the rear wheel support and pivotally connected to the second end of the connecting link. The front wheel support is movable between a first position corresponding to the deployed position of the stroller and a second position corresponding to the retracted position of the stroller. In its second position, the front wheel support also lies substantially in the plane defined by the frame.

Accordingly, it is an object of the present invention to provide a seat assembly of the type described above into which a collapsible stroller is mountable.

Another object of the present invention is to provide a seat assembly of the type described above having a stroller collapsible into a relatively small width.

Still another object of the present invention is to provide a seat assembly of the type described above having a collapsible stroller which, when deployed, has a center of gravity well within the wheel axes.

These and other objects, features, and advantages of the present invention are readily apparent from the following detailed description of the best mode of practicing the invention when taken in conjunction with the accompanying drawings.

BRIEF DESCRIPTION OF THE DRAWINGS

FIG. 1 is a perspective view of a motor vehicle including seat assembly according to the present invention;

FIG. 2 is a perspective view of the seat assembly apart from the vehicle;

FIG. 3 is a side view of a collapsible stroller according to the present invention in a deployed position;

FIG. 4 is a side view similar of the stroller in a retracted position; and

FIG. 5 is an exploded perspective view of the stroller in the retracted position.

BEST MODE FOR CARRYING OUT THE INVENTION

With reference to the drawings, the preferred embodiments of the present invention will be described. FIGS. 1 through 5 show a seat assembly 10 according to the present invention for the interior of a motor vehicle 12. The seat assembly 10 comprises a seat back 14 and a collapsible stroller 16. The stroller 16 is movable between a deployed position best shown in FIG. 3 and a retracted position best shown in FIG. 4. In the retracted position, the stroller is attachable to the seat back 14, and preferably received within a recess 18 formed in the seat back.

The stroller 16 includes a frame 20, a front wheel support 22, a rear wheel support 24, and a connecting link 26. The rear wheel support 24 is connected to the frame 20 at a first connection point 28, and is pivotable about the first connection point between a first position shown in FIG. 3 corresponding to the deployed position of the stroller 16, and a second position shown in FIG. 4 corresponding to the retracted position of the stroller. In its second position, the rear wheel support 24 lies substantially in a plane defined by the frame 20.

The connecting link 26 preferably includes a pair of connecting link members 29. One end of each connecting link member 29 is connected to the frame 20 at a second connection point 30. The front wheel support 22 is pivotally connected to the rear wheel support 24, and is also pivotally connected to the other end 32 of the connecting link 26. Like the rear wheel support, the front wheel support 22 is movable between a position shown in FIG. 3 corresponding to the deployed position of the stroller 16, and another position shown in FIG. 4 corresponding to the retracted position of the stroller. In its second position, the front wheel support 22 also lies substantially in the plane defined by the frame 20.

The frame 20 preferably includes a pair of opposed frame members 34 best shown in FIG. 5. The frame members 34 are connected together by the rear wheel support 24, which includes a pair of opposed rear wheel support members 36. Similarly, the front wheel support 22 preferably includes a pair of opposed front wheel support members 38. A rear wheel 40 is mounted to each of the rear wheel support members 36, while a front wheels 42 is mounted, preferably by casters 44, to each of the front wheel support members 38. Of course, it should be appreciated that all of the wheels can be provided with casters so that, when the stroller is in the retracted position, the wheels fold into the storage plane. In either arrangement, the rear wheels 40 are preferably disposed slightly inboard of the front wheels 42 when the stroller 16 is folded for storage.

A pair of handles 46, each of which is preferably tubular in cross-section, telescope within the frame 20 as shown in FIG. 5. When the stroller 16 is in its retracted position, the handles 46 are released from stops and pushed within the frame sections 34. In use, the handles 46 are lifted to the stops and rotated 90 degrees out of the plane of the frame 20. Alternatively, a unitary handle 48 also shown in FIG. 5 which includes a cross member 50 may be used with the stroller 16. A hammock-like chair 53, preferably formed of leather or cloth, is suspended from a cross bar 51 of the rear wheel support and between the rear wheel support members 36.

A storage pack 56 is connected to the frame 20, and provides space for storage of items such as diapers and clothes normally associated with the child being transported in the stroller. With a standard load in the pack 56, the stroller in the deployed position has a center of gravity that lies between a front axis extending between the front wheels 42 and a rear axis extending between the rear wheels 40.

For efficient storage, the recess 18 of the seat back 14 preferably has a shape or contour corresponding to the shape presented by the retracted stroller 16. Means 52 such as hooks, snaps, clips, latches or hook-and-loop type fasteners are provided to retain the retracted stroller 16 against the seat back 14. Other means such as a twist lock 54 may also be provided to lock the retracted stroller 16 against the seat back. When mounted, the retracted stroller, including the pack 56, preferably has a width no greater than three times the depth of the recess 18 so that the retracted stroller extends outwardly from the seat back 14 no more than twice the depth of the recess.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

We claim:

1. A seat assembly for a motor vehicle, the seat assembly comprising:
    a seat having seat portion and a back portion, the back portion including a front surface and a rear surface, a recess being formed in said rear surface; and
    a collapsible wheeled stroller having a deployed position and a retracted position, the stroller being received within the recess and releasably secured therein wile in the retracted position, the collapsible stroller including:
    a frame substantially defining a plane;
    a rear wheel support connected to the frame at a first connection point, the rear wheel support being pivotable about the first connection point between a first position corresponding to the deployed position of the stroller and a second position corresponding to the retracted position of the stroller, the rear wheel support in its second position lying substantially in the plane defined by the frame;
    a connecting link having first and second ends, the first end of the connecting link being connected to the frame at a second connection point; and
    a front wheel support pivotally connected to the rear wheel support and pivotally connected to the second end of the connecting link, the front wheel support being movable between a first position corresponding to the deployed position of the stroller and a second position corresponding to the retracted position of the stroller, the front wheel support in its second position lying substantially in the plane defined by the frame.

2. The seat assembly of claim 1 wherein the connecting link is movable between a first position corresponding to the deployed position of the stroller and a second position corresponding to the retracted position of the stroller, the connecting link in its second position lying substantially in the plane defined by the frame.

3. The seat assembly of claim 1 wherein the first end of the connecting link is pivotally connected to the frame.

4. The seat assembly of claim 3 wherein the connecting link is movable between a first position corresponding to the deployed position of the stroller and a second position corresponding to the retracted position of the stroller, the connecting link in its second position lying substantially in the plane defined by the frame.

5. The seat assembly of claim 1 wherein the seat back recess has a first depth, and the stroller in the retracted position has a second depth, the second depth being not more than twice as great as the first depth.

6. The seat assembly of claim 1 further comprising a handle connected to the frame.

7. The seat assembly of claim 1 further comprising a handle telescopically engaged with the frame.

8. The seat assembly of claim 1 wherein the plane defined by the frame is generally parallel to a second plane substantially defined by the seat back.

9. The seat assembly of claim 1 wherein the plane defined by the frame is generally coplanar with a second plane substantially defined by the seat back.

10. The seat assembly of claim 1 wherein the first connection point is disposed generally below the second connection point.

11. The seat assembly of claim 1 wherein the frame comprises a pair of opposed frame members.

12. The seat assembly of claim 1 wherein the rear wheel support comprises a pair of opposed rear wheel support members.

13. The seat assembly of claim 1 wherein the front wheel support comprises a pair of opposed front wheel support members.

14. The seat assembly of claim 1 wherein the connecting link comprises a pair of opposed connecting link members.

15. The seat assembly of claim 1 wherein the recess includes a substantially planar bottom.

16. The seat assembly of claim 1 wherein the recess includes a bottom shaped to cooperate with a shape of the stroller in the retracted position.

17. The seat assembly of claim 1 further comprising a front wheel connected to the front wheel support.

18. The seat assembly of claim 1 further comprising a pair of rear wheels connected to the rear wheel support.

19. The seat assembly of claim 18 further comprising a pair of front wheels connected to the front wheel support, a center of gravity of the stroller lying between a front axis extending between the front wheels and a rear axis extending between the rear wheels.

20. The seat assembly of claim 1 further comprising a storage pack connected to the frame.

21. A seat assembly for a motor vehicle, the seat assembly comprising:
    a seat having a seat portion and a back portion, the back portion including a front surface and a rear surface, a recess being formed in said rear surface including a bottom; and
    a collapsible wheeled stroller having a deployed position and a retracted position, the stroller being received within the recess and releasably secured therein while in the retracted position, the collapsible stroller including:

a pair of opposed frame members connected together and substantially defining a plane;

a pair of opposed rear wheel support members, each of the rear wheel support members being connected to the frame at a first connection point, the rear wheel support members being pivotable about their respective first connection point between a first position corresponding to the deployed position of the stroller and a second position corresponding to the retracted position of the stroller, the rear wheel support members in their second position lying substantially in the plane defined by the frame;

a rear wheel connected to each rear wheel support member;

a pair of connecting links, each of the connecting links having first and second ends, the first end of each connecting link being pivotally connected to the frame at a second connection point generally above the first connection point, each connecting link being movable between a first position corresponding to the deployed position of the stroller and a second position corresponding to the retracted position of the stroller, the connecting links in their second position lying substantially in the plane defined by the frame;

a pair of opposed front wheel support members, each of the front wheel support members being pivotally connected to a corresponding one of the rear wheel support members and pivotally connected to the second end of a corresponding one of the connecting links, each front wheel support being movable between a first position corresponding to the deployed position of the stroller and a second position corresponding to the retracted position of the stroller, each front wheel support in its second position lying substantially in the plane defined by the frame;

a front wheel connected to each front wheel support member;

a storage pack connected to the frame; and a handle telescopically engaged with the frame;

the stroller in the retracted position having a shape corresponding to the shape of the seat back recess;

a center of gravity of the stroller lying between a front axis extending between the front wheels and a rear axis extending between the rear wheels.

\* \* \* \* \*